United States Patent
Lee et al.

(10) Patent No.: US 6,604,257 B1
(45) Date of Patent: Aug. 12, 2003

(54) APPARATUS AND METHOD FOR CLEANING A CONDUIT

(75) Inventors: Ming-Yi Lee, Chin-Yi (TW); Ying-Hsiang Chen, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 848 days.

(21) Appl. No.: 09/309,057

(22) Filed: May 10, 1999

Related U.S. Application Data

(63) Continuation-in-part of application No. 08/838,516, filed on Apr. 8, 1997.

(30) Foreign Application Priority Data

May 13, 1998 (JP) .......................................... 10-129906

(51) Int. Cl.$^7$ ......................... B08B 9/027; B08B 9/035
(52) U.S. Cl. .................... 15/304; 15/104.066; 15/249.2
(58) Field of Search .......................... 15/93.1, 104.066, 15/104.067, 104.068, 104.069, 249.2, 249.3, 304

(56) References Cited

U.S. PATENT DOCUMENTS

| | | | | |
|---|---|---|---|---|
| 1,735,488 A | * | 11/1929 | Baird .......................... | 15/249.2 |
| 3,795,181 A | * | 3/1974 | Lawson .................. | 15/249.2 X |
| 4,433,449 A | * | 2/1984 | Rainey .............. | 15/104.067 X |
| 4,976,002 A | * | 12/1990 | Leonov et al. ................. | 15/304 |
| 5,428,861 A | * | 7/1995 | Hesard et al. ................. | 15/304 |

* cited by examiner

*Primary Examiner*—Terrence R. Till
(74) *Attorney, Agent, or Firm*—Tung & Associates

(57) ABSTRACT

The present invention discloses an apparatus and method for cleaning an exhaust conduit that has chemical substances deposited on its inside wall by utilizing a shaft that has a plurality of scraping elements mounted thereto capable of making vertically or radially oscillating motions inside the exhaust conduit such that the chemical substances can be dislodged from the inside wall and the exhaust conduit can be effectively cleaned. The apparatus may optionally include fluid nozzles provided in the shaft for dispensing a cleaning fluid during the cleaning process to further enhance the efficiency. The apparatus may further include a vacuum device for effectively removing the debris dislodged from the inside wall during such cleaning process.

17 Claims, 2 Drawing Sheets

FIG.1
(PRIOR ART)
FIG.2
(PRIOR ART)
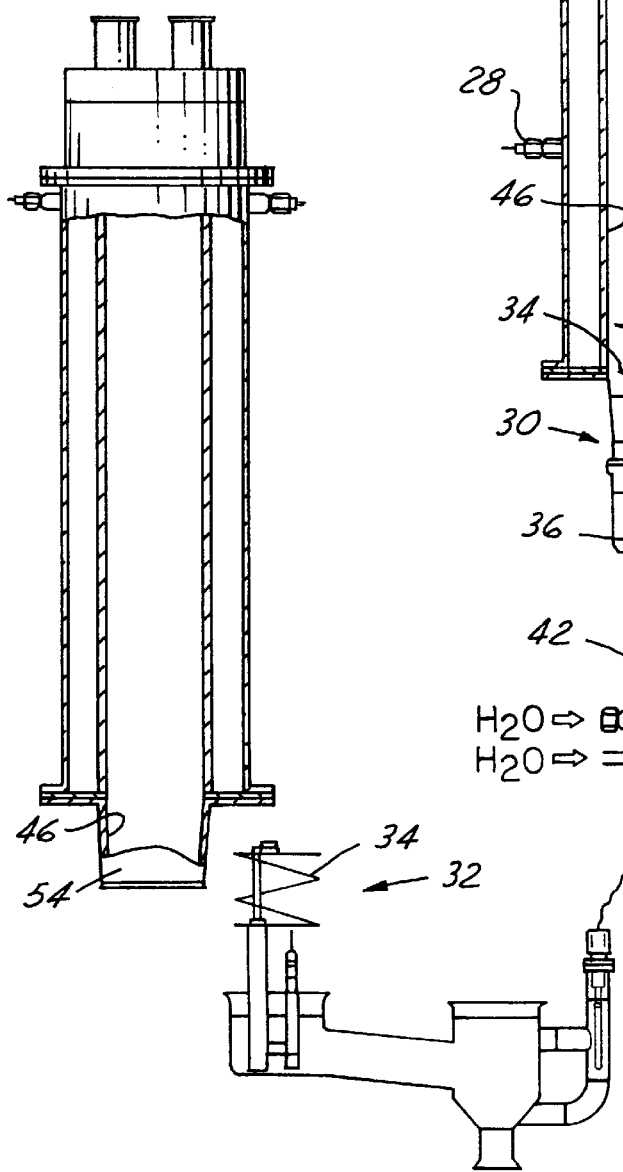
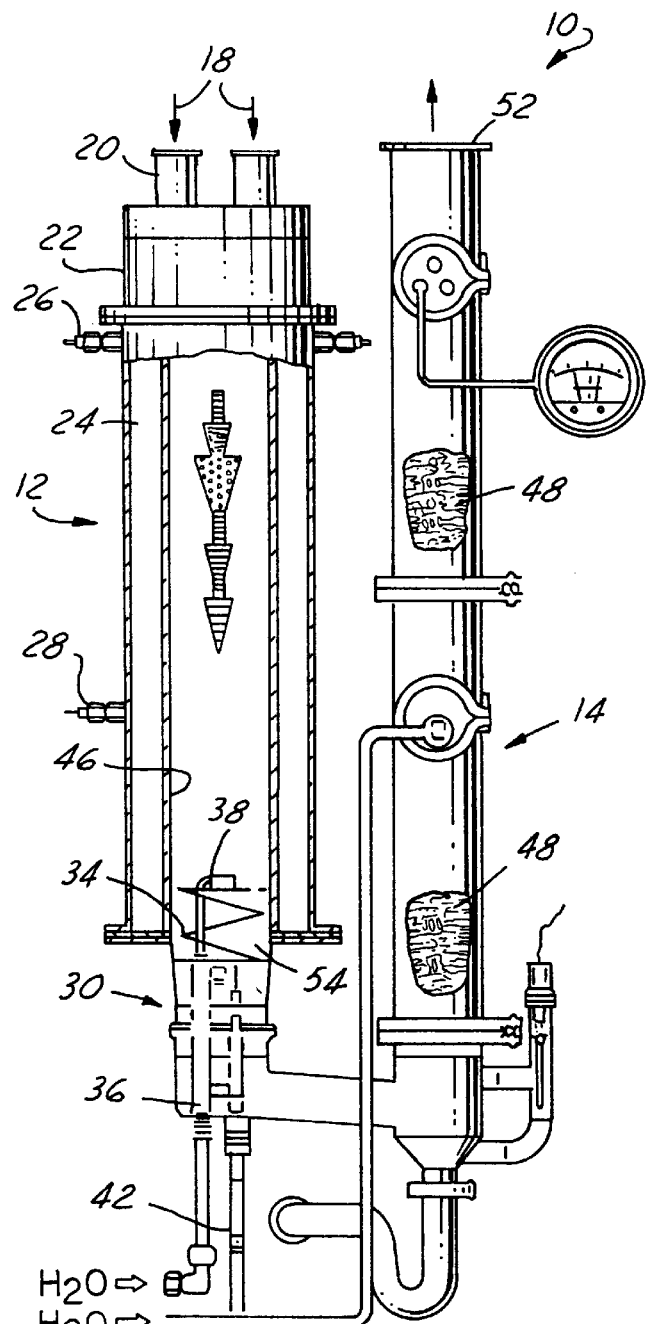

US 6,604,257 B1

APPARATUS AND METHOD FOR CLEANING A CONDUIT

This is a request for filing a Continuation-In-Part application of pending prior application Ser. No. 08/838,516, filed on Apr. 8, 1997.

FIELD OF THE INVENTION

The present invention generally relates to an apparatus and a method for cleaning a conduit that has chemical substances deposited on its inside wall and more particularly, relates to an apparatus and method for cleaning an exhaust conduit that has chemical substances coated on its inside wall by using a shaft equipped with scraping elements that is capable of moving in both the radial and the vertical direction, the apparatus may further include fluid nozzles and a vacuum means to facilitate the removal of such substances.

BACKGROUND OF THE INVENTION

In the chemical industry, many processes conducted in a fabrication plant require the treatment of effluent or exhaust gases from a process machine. The treatment is necessary to either complete a chemical reaction such that non-reacted chemicals are not released into the atmosphere, or to convert toxic or flammable components of the exhaust gases into non-toxic and non-flammable components before they are released into the atmosphere. The treatment of effluent gases is especially important in the semiconductor fabrication industry since most of the process gases utilized in the industry are either highly toxic or highly flammable.

As an example, a conventional controlled decomposition/oxidation (or CDO) system 10 that is equipped with recirculation and sump pump is shown in FIG. 1. The system 10 is supplied by the Delatech Corp. as an exhaust gas conditioning equipment. The system 10 is effective in treating or scrubbing exhaust gases through a thermal reaction section 12 and a cooling/scrubbing section 14. Exhaust gases 18 from a semiconductor process machine enter into the system through inlets 20 and are first treated in an oxygenation reaction section 22. The oxygenated exhaust gases then enter the thermal reaction section 12 which is heated by a heating elements 24. The heating element 24 is powered by an electric wiring fed through wiring connector 26 and controlled by thermocouple 28. The thermally reacted exhaust gases then enter into a primary cooling/scrubbing section 30 which is equipped with a scraping element 34 and a water supply pipe 36. Cooling water (not shown) is sprayed through a nozzle opening 38 in order to cool off the high temperature thermally reacted exhaust gases. The temperature of the thermally reacted exhaust gases can reach above 800° C. and therefore must be cooled before it is processed by the secondary cooling/scrubbing section 14. The scraping element 34 is constructed of a spiral metal blade which can be moved up and down by the shaft 42. The vertical motion of the scraping element 34 is designed to remove the chemical substances that have been cumulated and deposited on the inside wall 46 of the exhaust conduit 54 which is the lower part of the thermal reaction section 12. These chemical substances include a variety of high temperature films, nitride powers and films, etc. A hard and highly resilient film is normally formed by these chemical substances. Cooled exhaust gases then enter the secondary cooling/scrubbing section 14 and are treated by the scrub packing 48 before it is released to the atmosphere through an outlet 52. The apparatus is effective for treating exhaust gases from a semiconductor fabrication process that contain toxic elements by first treating in a high temperature oxygenation reaction, then converting to a lower temperature and then converting the toxic substances into non-toxic substances such that they can be safely released into the atmosphere.

In the apparatus shown in FIG. 1, it has been found that while the usage of the apparatus achieves the desirable result of toxic gases conversion, the deposition of hard chemical substances on the inside wall 46 of the thermal reaction section 12 cannot be avoided. The conventional cleaning apparatus which is equipped with the scraping element 34 and the water spray nozzle 38 is not effective in cleaning the exhaust conduit 54. The spirally constructed scraping element 34 which is designed to have a maximum diameter slightly smaller than the inside diameter of the exhaust pipe 54, cannot adequately clean the inside wall 46 of the exhaust conduit 54. FIG. 2 is a view illustrating that the cleaning apparatus 32 has been removed from the exhaust conduit 54. The cleaning apparatus 32 moves only in the vertical direction to cause a rotational movement of the spiral scraping element 34 to scrape the inside wall 46 of the exhaust conduit 54. The cleaning of the inside wall 46 therefore cannot be effectively executed by the spiral blade 34. This is especially the case when after an extended period of operation, a hard deposit layer formed of chemical substances is adhered to the inside wall 46 and becomes very difficult to remove. When the thickness of the hard deposit layer becomes excessive, it sometimes jams the scraping blade 34 such that the exhaust gas treatment process has to be stopped and the machine has to be serviced.

It is therefore an object of the present invention to provide an apparatus and a method for cleaning a conduit that has chemical substances deposited on its inside wall that do not have the drawbacks and shortcomings of the conventional apparatus and method.

It is another object of the present invention to provide an apparatus and a method for cleaning a conduit that has chemical substances deposited on its inside wall by using a movable shaft and a plurality of scraping elements mounted on the shaft for cleaning the inside wall of the conduit.

It is a further object of the present invention to provide an apparatus and a method for cleaning an exhaust conduit that has chemical substances deposited on its inside wall by using a movable shaft equipped with a plurality of scraping elements that can move not only in a vertical direction but also in a radial direction.

It is another further object of the present invention to provide an apparatus and a method for cleaning an exhaust conduit that has chemical substances deposited on its inside wall by using a shaft equipped with a plurality of scraping elements that is capable of making vertical and radially oscillating movements for cleaning the chemical substances.

It is yet another object of the present invention to provide an apparatus and a method for cleaning an exhaust conduit that has chemical substances deposited on its inside wall by using a shaft that is equipped with a plurality of scraping elements and fluid nozzles for removing the chemical substances by spraying a cleaning fluid during the cleaning process.

It is still another object of the present invention to provide an apparatus and a method for cleaning an exhaust conduit that has chemical substances deposited on its inside wall by using a shaft equipped with a plurality of scraping elements for removing the chemical substances, and a vacuum device for removing the debris of such chemical substances.

SUMMARY OF THE INVENTION

In accordance with the present invention, an apparatus and a method for cleaning an exhaust conduit that has chemical substances deposited on its inside wall are provided by using a shaft equipped with a plurality of scraping elements that is capable of making vertical and radially oscillating motions against such chemical substances such that they can be effectively removed from the exhaust conduit.

In a preferred embodiment, an apparatus for cleaning a conduit that has chemical substances deposited on its inside wall is provided which has a movable shaft that has an upper portion and a lower portion, a plurality of scraping elements attached to the upper portion of the shaft, a drive means attached to the lower portion of the shaft for providing radial and vertical motions of the shaft, a housing adapted for receiving the shaft and the plurality of scraping elements and for collecting debris of the chemical substances during cleaning, and a controller for controlling the cleaning process.

In another preferred embodiment, an apparatus for cleaning an exhaust conduit is provided which includes a shaft that has an upper portion and a lower portion, a plurality of scraping elements attached to the upper portion of the shaft, a plurality of fluid nozzles provided in the upper portion of the shaft, a drive means that is attached to the lower portion of the shaft for providing motions in the radial and vertical directions, a housing for receiving the shaft end the plurality of scraping elements, and a controller for controlling the cleaning process.

The present invention is further directed to a method for cleaning a conduit that has chemical substances deposited therein which can be carried out by the operating steps of first providing a shaft that has an upper end and a lower end, the upper end of the shaft has a plurality of scraping elements attached thereto and the lower end of the shaft is attached to a drive means for providing radial and vertical motions to the shaft, the shaft and the drive means are mounted in a housing adapted for connecting to the conduit, then connecting the housing to the conduit, and then moving the shaft in a radial or vertical motion for removing the chemical substances from the inside wall of the conduit.

BRIEF DESCRIPTION OF THE DRAWINGS

These and other objects, features and advantages of the present invention will become apparent from the following detailed description and the appended drawings in which:

FIG. 1 is an illustration showing a conventional exhaust gas treatment device having a cleaning apparatus built therein.

FIG. 2 is an illustration of the exhaust gas treatment device of FIG. 1 with the cleaning device removed from the treatment device.

DETAILED DESCRIPTION OF THE PREFERRED EMBODIMENT

Figures 3, 4:
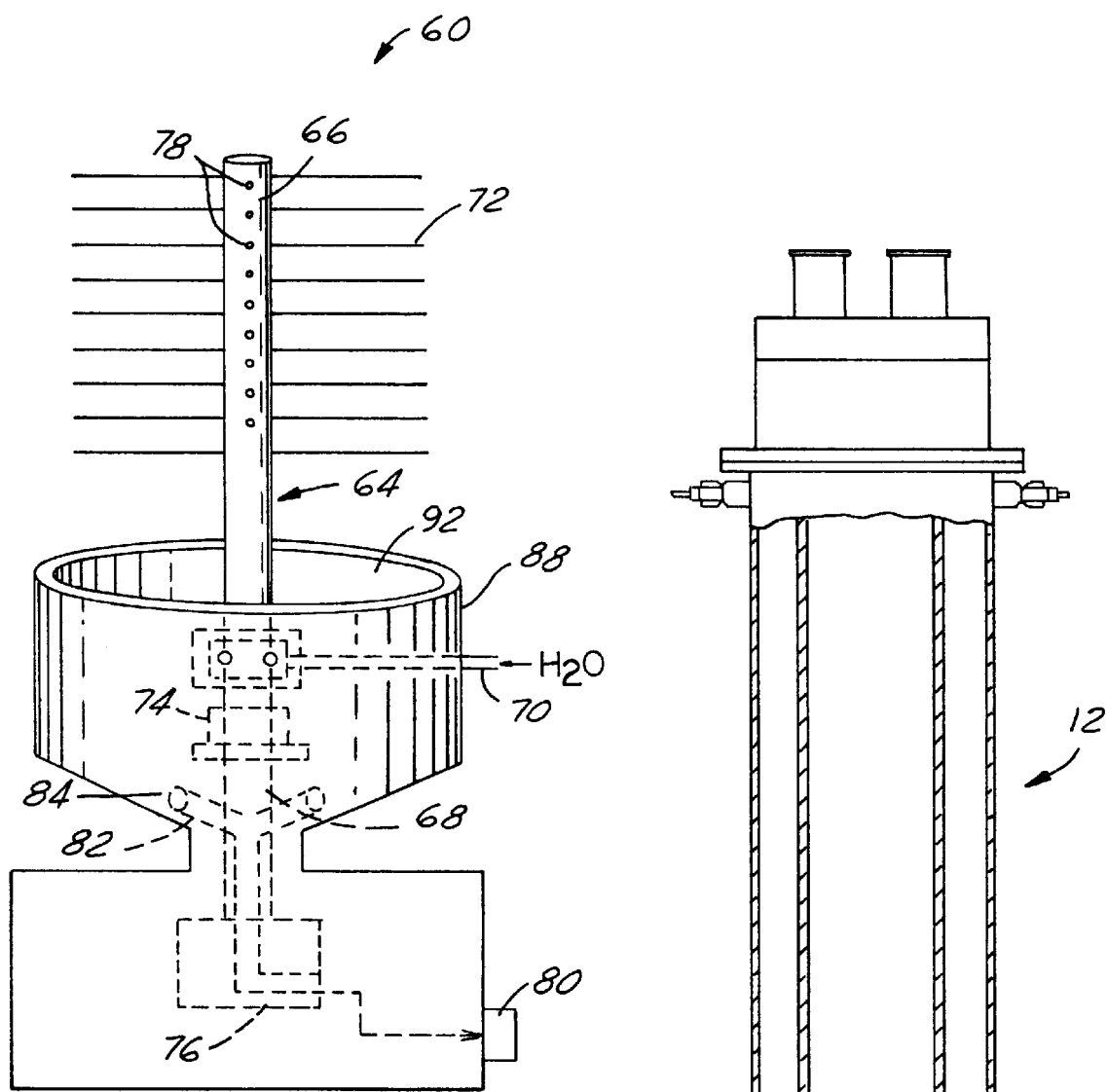
FIG. 3 is an illustration of the present invention cleaning apparatus consisting of a shaft, a plurality of scraping elements and a housing.
FIG. 4 is an illustration of the present invention cleaning apparatus attached to an exhaust gas treatment device.

The present invention discloses an apparatus and a method for cleaning an exhaust conduit that has chemical substances deposited on its inside wall by utilizing a shaft that is equipped with a plurality of scraping elements for moving in both a radial and a vertical direction to effectively clean the inside wall of the conduit. The apparatus may optionally include a plurality of nozzles provided in an upper portion of the shaft for spraying a fluid for more effectively cleaning the substances on the inside wall while the scraping elements frictionally engage the substances. The apparatus may further include a vacuum that is provided in a housing for the shaft and the scraping elements for collecting debris generated during the cleaning process.

Referring now to FIG. 3, wherein an enlarged view of the present invention cleaning apparatus 60 is shown. The apparatus 60 is constructed of a shaft 64 which has an upper portion 66 and a lower portion 68. The upper portion 66 has a plurality of scraping elements 72 attached to it for providing frictional engagement with the inside wall 46 of the exhaust conduit 54 (shown in FIG. 4). The scraping elements 72 can be stainless steel blades or stainless steel bristles, or blades or bristles of any other resilient and chemical resistant material. Stainless steel is more preferred since it is chemically resistant to most corrosive materials and has high strength and durability. The scraping elements 72 may also be braided wires that are made of stainless steel or other materials. The total length of the scraping elements 72, or the diameter as measured from one end to the other with the shaft 66 thereinbetween should be approximately the same as the inside diameter of the interior wall 46 to be cleaned. This is important since the scraping elements 72 must provide a sufficient frictional engagement with the interior wall 46 of the exhaust conduit 54 such that proper friction forces exert to remove the chemical substances from the wall 46. The scraping elements 72 may also have a total length that is slightly larger than the inside dimension of the exhaust conduit 54 in order to allow the application to a slightly tapered exhaust conduit 54 like that shown in FIG. 4.

The lower portion 68 of shaft 64 is mounted to a drive means, e.g., a motor 76 for driving the shaft 64 for up/down movement in the vertical direction. The rotary motor 74 may be provided such that the shaft 64 is capable of oscillating alternatingly in clockwise and counter-clockwise direction (or in circumferential direction). A controller (not shown) may be provided to control the drive means 74 such that it may provide both the vertical and the radially oscillating motions simultaneously for more effective cleaning. The drive means 74 may further be provided such that the shaft 64 rotates in one direction if such movement is more advantageous than the oscillating movement for achieving a high cleaning efficiency. The frequency of the oscillating motion or the rotational speed of the shaft 64 can be suitably controlled to achieve such high cleaning efficiency. It has been observed that an oscillating clockwise and counter-clockwise motion provides one of the more efficient methods for cleaning chemical deposits on the inside wall 46.

The present invention cleaning apparatus 60 may further be provided with fluid nozzles 78 in the upper portion 66 of the shaft 64. The fluid nozzles 78 are provided such that during the cleaning process, i.e., when the shaft 64 is moved up and down or oscillating clockwise and counter-clockwise, a cleaning fluid fed from inlet 70 can be sprayed from nozzles 78 to further enhance the cleaning efficiency of the apparatus. When the chemical deposits on the inside wall 46 is of a water soluble nature, water can be used as the cleaning fluid to effectively dissolve the deposits during the cleaning process. When the chemical deposits on the inside wall 46 are of a nature that can be dissolved only by a specific solvent, then such solvent should be used to enhance cleaning.

The present invention cleaning apparatus 60 may further include a vacuum means 82 that can be suitably provided through the lower portion 68 of the shaft 64. The vacuum means 82 is provided with debris collecting ports 84 for picking up debris particles during the cleaning process. The vacuum means 82 can also be provided in any other suitable manner that is not associated with the shaft 64. The shaft 64, the plurality of scraping elements 72 and the drive means 74 can be suitable positioned in a housing 88. Housing 88 has an opening 92 that has an inside diameter slightly larger than the outside diameter 94 of the conduit chamber 54 such that housing 88 can be readily fitted over the exhaust conduit 54 during a cleaning process.

The operation of the present invention novel cleaning apparatus 60 can be described as follows. After the exhaust conduit 54 is disconnected from the exhaust gas treatment apparatus (as shown in FIG. 2), the present invention cleaning apparatus 60 can be conveniently placed under the exhaust conduit 54 and positioning the housing 88 on the outside of the conduit 54. After water connection 70 is made to supply water to the spray nozzles 78 and a vacuum source is connected to vacuum inlet 80, the cleaning operation for the chemical substances deposited on the inside wall 46 of the exhaust conduit 54 can be started. A controller (not shown) first instruct the up/down motor drive means 76 to extend the shaft 64 fully or to a proper height inside the exhaust conduit 54 depending on the location of the chemical substances on the interior wall 46, the shaft 64 is then activated by rotary motor 74 to either turn in a circumferential direction or oscillates in a clockwise/counter-clockwise direction such that the scraping elements 72 frictionally engaging the inside wall 46 for removing the chemical substances. The shaft 64 may also be moved in a vertical direction simultaneously with the rotational or oscillating motion to enhance the cleaning efficiency.

A solvent, or water may be sprayed from spray nozzles 78 during the oscillating or rotational motion of the shaft 64 to further enhance the cleaning process by dissolving the chemical deposits on the wall 46. The debris loosened by the cleaning process from the wall can be conveniently picked up by the vacuum ports 84 through vacuum line 82 and removed out of the system.

It should be noted that while in the preferred embodiment, the cleaning of an exhaust conduit in an exhaust gas treatment apparatus is used to demonstrate the present invention novel apparatus and method, any other conduit that has chemical substances deposited on its inside wall may utilize the present invention apparatus and method for effective cleaning of such substances While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. An apparatus for removing chemical substances deposited on an inside wall of a conduit in a cleaning process comprising:
   a movable shaft having an upper portion and a lower portion,
   a plurality of scraping elements attached to said upper portion of the shaft,
   drive means attached to said lower portion of the shaft for providing both vertical and circumferential motions of said shaft,
   a housing adapted for receiving said shaft and said plurality of scraping elements, and
   a controller for controlling said cleaning process by a plurality of scraping elements driven by said movable shaft to scrape said chemical substances deposited on the inside wall of said conduit.

2. An apparatus according to claim 1 further comprising a plurality of nozzles provided in said upper portion of the shaft for spraying a fluid.

3. An apparatus according to claim 2, wherein said shaft is adapted to move in alternating clockwise and counter-clockwise directions and to spray water from said nozzles simultaneously.

4. An apparatus according to claim 1 further comprising a vacuum means provided in said housing for collecting debris generated during a cleaning process.

5. An apparatus according to claim 4, wherein said vacuum means is provided through a vacuum passage in said lower portion of the shaft.

6. An apparatus according to claim 1, wherein said movable shaft is adapted to oscillate in a circumferential direction of said shaft.

7. An apparatus according to claim 1, wherein said movable shaft is adapted to oscillate in alternating clockwise and counter-clockwise directions at a frequency sufficient to remove said chemical substances on the inside wall.

8. An apparatus according to claim 1, wherein said movable shaft is adapted to move in alternating clockwise and counter-clockwise directions and a vertical direction simultaneously.

9. An apparatus according to claim 1, wherein said shaft is adapted to rotate about its central axis.

10. An apparatus according to claim 1, wherein said plurality of scraping elements are selected from group consisting of stainless steel bristles and stainless steel blades.

11. An apparatus according to claim 1, wherein said scraping elements having a dimension in the axial direction sufficient to provide a frictional engagement with the inside wall of said conduit.

12. An apparatus for cleaning an exhaust conduit in a cleaning process comprising:
   a shaft having an upper portion and a lower portion,
   a plurality of scraping elements attached to the upper portion of the shaft,
   a plurality of fluid nozzles provided ins aid upper portion of the shaft,
   drive means attached to the lower portion of the shaft for providing motions in the circumferential and vertical directions of said shaft,
   a housing for receiving said shaft and said plurality of scraping elements, and
   a controller for controlling said cleaning process by a plurality of scraping elements driven by said movable shaft to scrape said chemical substances deposited on the inside wall of said conduit.

13. An apparatus according to claim 12 further comprising vacuum means for collecting debris generated during a cleaning process.

14. An apparatus according to claim 13, wherein said vacuum means is provided through the lower portion of the shaft.

15. An apparatus according to claim 12, wherein said scraping elements are selected from the group consisting of stainless steel blades and stainless steel bristles.

16. An apparatus according to claim 12, wherein said housing having an inside dimension larger than the outside dimension of said exhaust conduit.

17. An apparatus according to claim 12, wherein said scraping elements having a dimension in the axial direction sufficient to provide a frictional engagement with an inside wall of said exhaust conduit.

* * * * *